United States Patent [19]

Wright

[11] Patent Number: 4,862,011
[45] Date of Patent: Aug. 29, 1989

[54] ELECTRICAL PLANAR CABLE INTERCONNECTION BETWEEN VEHICULAR DOOR AND BODY

[75] Inventor: James A. Wright, Dearborn Heights, Mich.

[73] Assignee: United Technologies Automotive, Inc., Dearborn, Mich.

[21] Appl. No.: 191,089

[22] Filed: May 6, 1988

[51] Int. Cl.$^4$ ............................................ H01B 13/00
[52] U.S. Cl. ................................ 307/10.1; 174/72 A; 296/146; 361/428; 439/34
[58] Field of Search ............... 49/502; 296/146, 152; 361/331, 332, 398, 428, 429; 307/10 R, 147; 174/72 A, 117 F; 439/34, 492, 495, 498, 499

[56] References Cited

U.S. PATENT DOCUMENTS

| | | | |
|---|---|---|---|
| 3,836,415 | 4/1974 | Hilderbandt | 307/10 R |
| 4,652,772 | 3/1987 | Shephard | 174/117 F |
| 4,700,961 | 10/1987 | Thomas | 307/10 R |

FOREIGN PATENT DOCUMENTS 0000912  1/1982  Japan .................................. 296/146

OTHER PUBLICATIONS

IRC publication, p. 66, 10/14/60, "Flat, Flexible Cable".

Primary Examiner—Gerald P. Tolin

[57] ABSTRACT

An electrical, multi-wire interconnection between the hinged, movable door (3) of a vehicle and its main body (7) across the hinge gap in the form of a planar cable array (10) having a flat, laterally extended cross-section (FIG. 3), provided with a modular trim panel (3A). It includes at its distal, "A" pillar end an end connector (5A), which mates with an electrical connector (5B) in the "A" pillar. The cable fits in an embossed channel, to which it is like configured, in the door frame. When the door is closed, it is sealingly sandwiched between the metal door frame member (3B) and the rubber door seal on the vehicle body. The door may include a remote multiplexing (remux) unit (30), allowing the use of, for example, as few as about eight wires (11), even though the door is fully powered. The planar cable array can be pre-manufactured as, for example, flat ribbon cable, or made on site using a hardenable plastic (FIG. 5A) or tape-type (FIG. 5B) material during a pre-assembly, modular door panel operation off from the regular main assembly line of the final, automotive manufacturing operation. In its extent between the door and the vehicle body, the plane of the cable is vertically aligned and folds back unto itself when the door is closed (FIG. 2A) and has no significant, excess slack when the door is fully open (FIG. 2B). The wires can be included in the same plane or in up to about three, parallel layers.

15 Claims, 5 Drawing Sheets

ELECTRICAL PLANAR CABLE INTERCONNECTION BETWEEN VEHICULAR DOOR AND BODY

DESCRIPTION

1. Technical Field

The present invention relates to the electrical interconnection between an automotive or vehicular door, having a number of electrical components in it, and the main body of the vehicle, to which the door is, for example, hingedly attached. More particularly the present invention relates to providing the electrical, multi-wiring interfacing interconnection between the door and the main body of the vehicle across the hinge gap in the form of a relatively flat, planar cable, as opposed to the rounded, relatively thick wire bundle of the prior art.

2. Background Art

In automotive construction, typically one or more electrical components are included within the automotive door, particularly the driver's door, which are powered and/or controlled by the main electrical system of the vehicle. Examples of such automotive components include power door locks, power windows, power mirrors, electrical lights, audio speakers, and/or various control switches for seat adjustments and the like, etc.

To power these exemplary components, typically a round, electrical cable bundle is extended to the front doors from the "A" pillars of the main vehicle to connect these door components into the main electrical system of the vehicle.

Typically, the interconnecting cable, which extends from the body of the car through the "A" pillar into the door, includes a series of wires, for example, twenty-five, bundled together into a rounded, cylindrically shaped, extended bundle. Because of the nature of this construction, the cable bundle at least generally has to have a vertically or laterally extended run in its extension from the door frame to the "A" pillar, which usually has somewhat of an "S" configuration. This vertically or laterally extended run prevents wires on the outside areas of the cylindrical cable bundle from becoming over-stressed, as the door is continuously opened and closed during the life-time use of the vehicle, which could cause the outer electrical wires in the bundle to break.

Such an exemplary prior art cable bundle construction, with a vertical run, is shown in FIG. 1.

In contrast, the present invention uses a relatively flat, planar cable array at the door junction. Such a planar cable array avoids the need for any vertically or laterally extended run of the cable and inherently avoids any over-stressing of the cable as the door is opened and closed during its normal operation. The present invention thus provides a more compact, shorter run, saving on wiring expense and taking up less space, while providing an electrical interconnecting which is highly reliable, flexible and long-lasting. It additionally eliminates the relatively costly, protecting rubber boot typically used across the hinge gap to cover the cylindrical cable bundle of the prior art.

DISCLOSURE OF INVENTION

Thus, the present invention utilizes a relatively flat, planar cable array at the door junction in place of the typical, cylindrical, relatively thick cable bundle, having a relatively large number of wires across its diameter or center cross-section, used in the prior art. Such a relatively flat array includes multiple, at least generally parallel, wires, in which all of the wires lie in the same plane, similar to flat ribbon cable, or in multiple layers, including up to about three parallel planes. The main criteria is that the cable array not have more than about three wires across its thickness and is typically relatively thin, being usually substantially wider than it is thick, with its thickness being comparable to one or at most about three wires thick, typically with a ratio of thickness to width of about no more than 1:4, or, stated in others terms, the cable array typically will be at least about four times wider than it is thick.

When provided as part of a modular door panel, the at least relatively flat planar cable is sandwiched between the modular door panel and the door frame member, with typically the opposed portion of the flexible door seal on the vehicle body and the cable and the door frame side edge area in combination forming a face-to-face seal. This eliminates the need for the relatively costly step of punching a hole in the side edge of the metal door frame. Additionally, the planar cable preferably is terminated in an end connector, which mates with a like connector positioned in an opening in the "A" pillar of the vehicle, which also provides economies in cost and assemblly time.

The planar cable array interconnection between the door and the main body of the car can be made up in a prior, wire manufacturing operation or assembled and manufactured on-site as part of the door assembly or sub-assembly operation. In such on-site manufacturing the multiple wires are arrayed and held in parallel juxtaposition and their relative positions fixed in place by, for example, a premolded, flexible plastic part or by the application of an appropriate holding or bonding medium in the form of, for example, adhesive tape or in the form of an initially fluid plastic medium, which ultimately hardens around the wires, holding them in place.

With respect to a sub-assembly application, the planar cable can be manufactured as part of, for example, a modular door panel manufacturing operation, in which the required number of wires are encapsulated in situ or otherwise enclosed during the sub-assembly operation. For further information on such an exemplary modular door panel subassembly operation, reference is had to assignee's copending U.S. pat. application Ser. No. 07/097,555 of R. Basson et al, filed Sept. 15, 1987, entitled "Modular Trim Panel Unit For Motor Vehicle Doors," the disclosure of which is incorporated herein by reference.

The present invention is may be used in conjunction with a multiplexing system, wherein part of the multiplexing is achieved by a "remux" or remote multiplexing control panel module located within the door itself. This allows for, for example, as few as eight wires, even for a fully powered door which includes an electrically powered window and controls for the other powered windows, a powered door lock, audio speaker, seat positioning controls, and even a powered, heated side rear-view mirror. Such a system, having a relatively few wires despite its large number of electrical components, particularly lends itself to the present invention and the invention's planar cable approach to interconnecting the automotive powered door to the main electrical power system located within the body of the vehicle.

For further information on such an automotive door multiplexing system reference is had to assignee's co-pending U.S. Pat. application Ser. No. 191,097 of D. Tinder, filed on even date herewith, entitled "Automotive Door Multiplexing System", the disclosure of which is also incorporated herein by reference.

The foregoing and other features and advantages of the present invention will become more apparent from the following further description and drawings.

BRIEF DESCRIPTION OF DRAWINGS

FIG. 2A is a top, partial, detail, cross-sectional view showing the planar cable interconnection of FIG. 2 across the hinge gap folded back at least partially unto itself when the door is in its closed position; while

FIG. 5A is an end, cross-sectional view a modular door panel made in a sub-assembly operation for ultimate assembly with a door frame on the main assembly line, with the modular door panel using the planar cable interconnection of the present invention, with the wires of the planar cable being positioned on the back-side of the modular door panel and with the wires being made into the planar cable by being cast in situ with the use of a fluid material which hardens in place as part of the modular panel sub-assembly operation; while

BEST MODE FOR CARRYING OUT THE INVENTION

Figure 1:
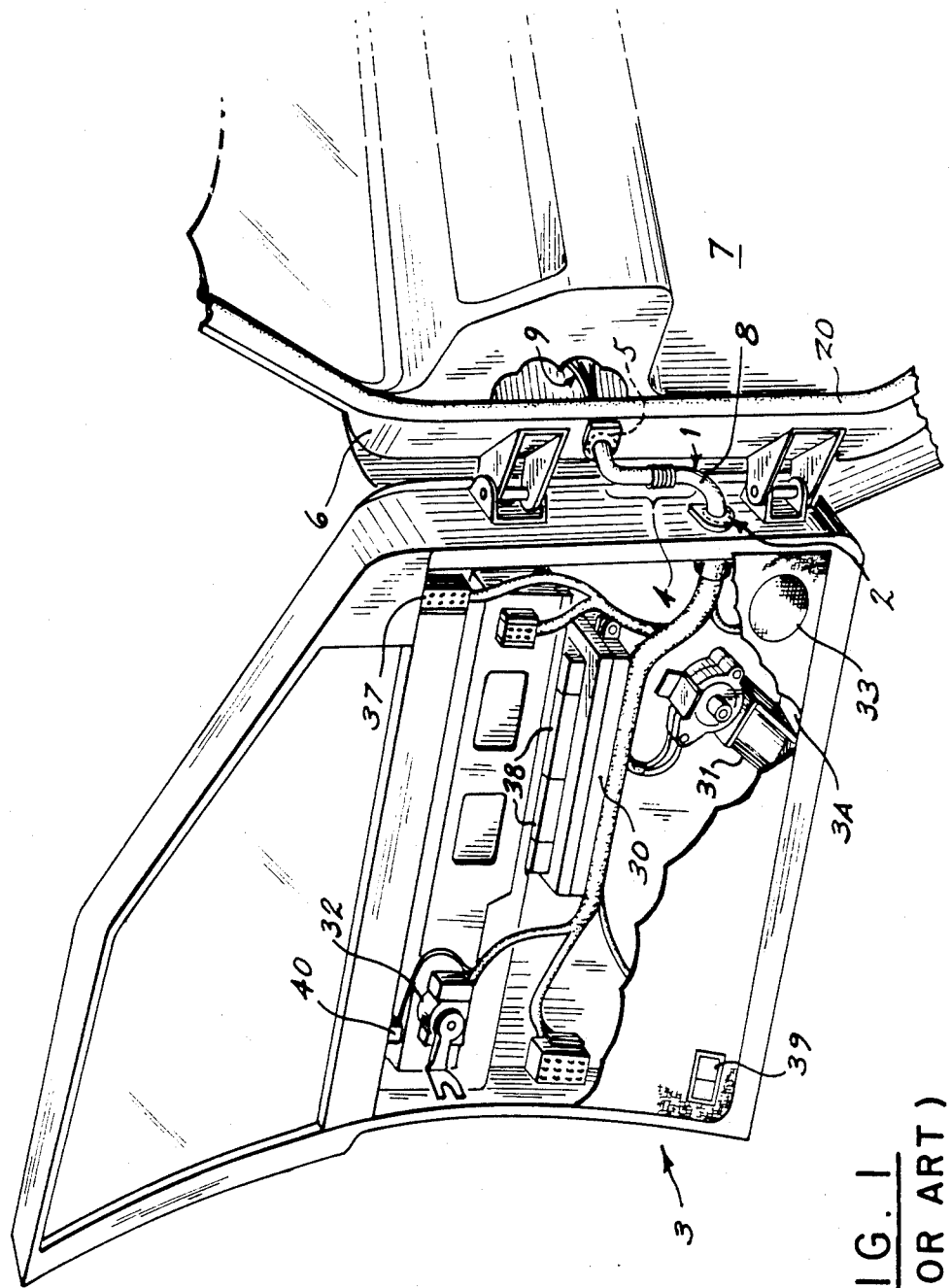
FIG. 1 is a perspective view taken from the interior side of the driver's door (with the finish trim layer partially cut away to show the internal electrical components) in its open position, showing the prior art's cylindrically extended, relatively thick, cable bundle extending in a "S" configuration from the door into the "A"-pillar, using in part a vertical run, for the electrical interconnection of the electrically powered door components into the main electrical system of the vehicle.

As can be seen in FIG. 1, the typical prior art approach to interconnecting the various electrical components in a door to the main electrical system of the vehicle included a bundle of, for example, twenty-four wires bundled together in a rounded, cylindrically extended, relatively thick cable bundle 1. Such an exemplary wire bundle 1 might have a diameter of, for example, approximately three-quarters of an inch.

The bundle 1 typically extends between a door opening or cut out area 2 in the near side edge of the door 3, in somewhat of a "S" configuration with a vertical (or lateral) run 4 across the hinge gap, and a body opening or cut out area 5 in the "A" pillar 6 of the vehicle body 7. The cable bundle 1 actually beings in the vehicle body 7 in the form of a number of individual wires 9 (for example twenty-four), which in the assembly line operation are extended in a bundle, typically through the tubber protective boot 8, into the door 3. The main electrical system is typically powered by a twelve or twenty-four volt DC battery or the vehicle's alternator system.

The vertical (or lateral) run 4, which causes the cable bundle 1 to essentially take somewhat of an "S"configuration, is necessary to prevent the outer wires of the cable bundle from becoming over-stressed as the door is continuously opened and closed in its normal operation and use over the life-time of the vehicle. Without such a vertically extended "S" configured run, or a laterally extended run, or other equivalent extension, the outer individual wires of the bundle 1 would likely become overstressed and broken, breaking and deactivating the electrical circuit(s) associated with the broken wire(s).

Figure 2:
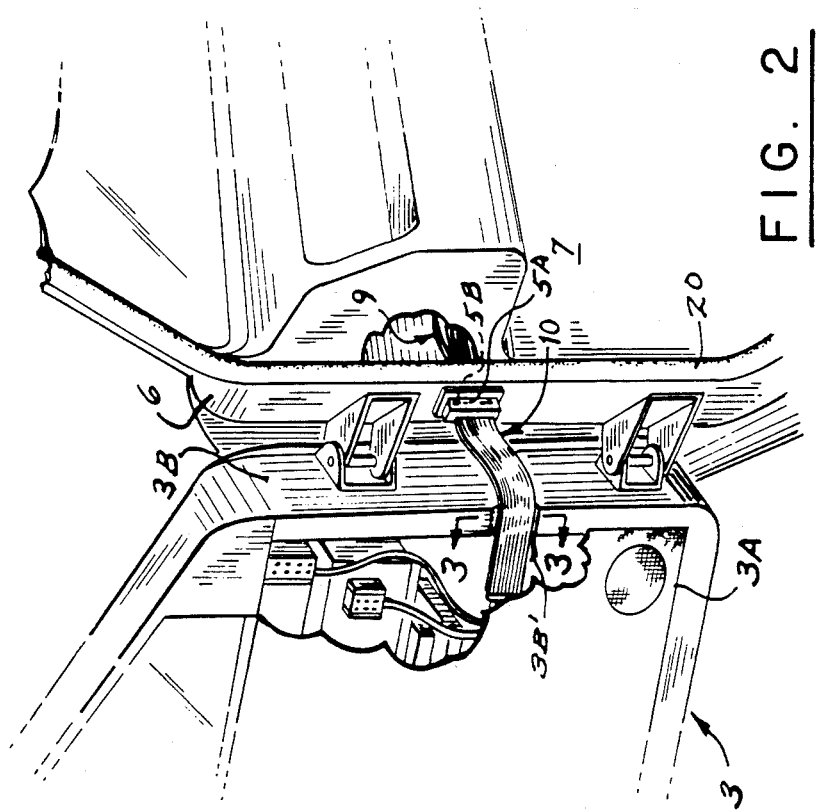
FIG. 2 is a like perspective view to that of FIG. 1, but instead being only a partial view of the door and illustrating the preferred, exemplary embodiment of the planar cable array of the present invention used for the electrical interconnection of the door to the vehicle's main electrical system, with the plane of the cable being at least generally vertically aligned and positioned in an embossed area between the door frame and the interior trim panel module.

In contrast, as can be seen in FIG. 2, the electrical interconnection of the present invention, in its extension from the door 3 to the "A" pillar 6 across the hinge gap, takes the form of a flat, planar cable 10, which avoids the need for any vertical or lateral run having an "S" configuration or the like for the electrical interconnecting cable.

Figure 3:
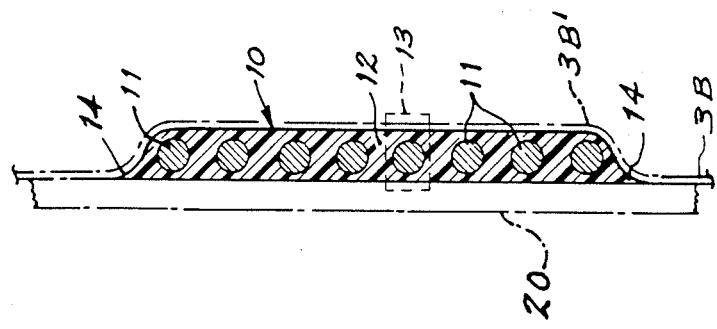
FIG. 3 is a cross-sectional, end view of an exemplary planar cable array showing eight exemplary electrical wires all lying in the same lateral plane, taken along section lines 3—3 of FIG. 2, also showing, when the door is closed, the sealing, sandwich engagement between the cable and the embossed channel and its surrounding edge areas of the door frame member and the flexible seal member on the vehicle body (the latter members being shown in phantom line).

As can be seen in FIG. 3, the planar cable 10 of the invention is flat and laterally extended, being substantially wider than it is thick, ideally having each of the individual wires 11 located in the same lateral plane held in their relative positions by being placed in a plastic, insulating band or webbing of material 12. Each orthogonal section 13 of the cable 10, as it is laterally traversed from side to side, includes only one wire.

Alternatively, if there are a relatively large number of wires, including for example, forty-five wires, multiple layers of wires could be used, for example, three parallel layers of fifteen wires each. However, no more than about three layers should be used in order to avoid the potential of over-stressing of the outer wires of the prior art, as the cable is flexed back and forth during the opening and closing of the door. As a general rule the planar cable array should not be less than about four times as wide as it is thick.

Thus, in order to allow the cable array to be continuosly bent back and forth directly back upon itself without damaging any of the wires 11 over a period of time, the cable array 10 must be kept relatively thin and flat, preferably with a maximum of three wires occupying each orthogonal section 13 across the width of the cable array (note FIG. 3). As can best be seen in FIG. 3, the edges 14 of the planar cable 10 are flared and configured to mate with the opposed, curved, embossed area or channel 3B' in the metal door frame section 3B in order to form a face-to-face sealing engagement with it. In combination together and when the door 3 is closed (note FIGS. 2A & 3), they form —with the flexible, typically rubber, door seal 20 located on the body of the vehicle —flat, vertical, interfacing surfaces to provide a good seal. By this faceto-face, combined, sealing engagment between the planar cable, the door frame member 3B and the rubber door seal 20, no metal cut out or opening in the door frame member, which typically required a separate sealing member, is necessary, as in the prior art of FIG. 1, but instead only the relatively inexpensive stamped, embossment channel 3B', shown in FIGS. 2 and 3, is needed. Other designs are of course possible, but the important thing is that the three elements together form a seal between them at the side edge area of the door frame member 3B.

An exemplary, single layer cable made in accordance with the present invention could have, for example, a thickness of preferably about two-tenths of an inch and a width of the order of about one-and-a-quarter inches for an eight or nine wire array, thus having an exemplary ratio of thickness to width of about 16:100, which of course is less than the exemplary maximum ratio of about 1:4.

The planar cable array 10 can be pre-manufactured as, for example, flat ribbon cable, or initially provided as separate, preferably individually insulated wires. The individual wires are then in the assembly of the door, or in the manufacture of a modular door panel is a sub-assembly operation, extended and positioned in juxtaposed, parallel array and cast in situ or otherwise held together, as explained more fully below with reference to FIGS. 5A & 5B.

Figure 2A:
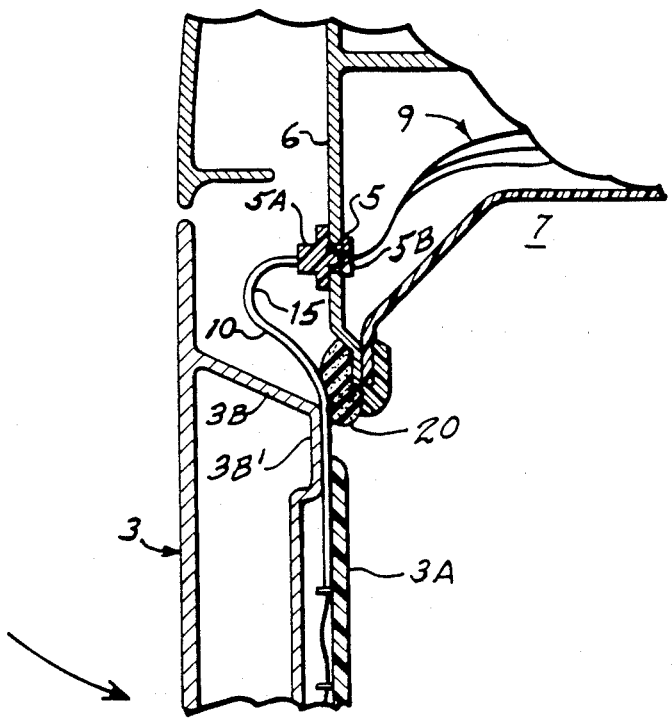
Figure 2B:
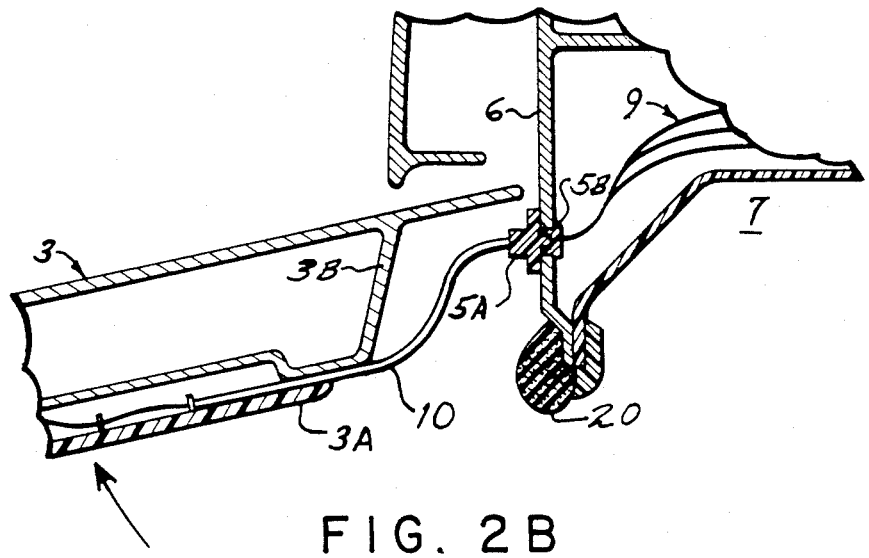
FIG. 2B is a view similar to that of FIG. 2A, but with the door in its fully open position, with the planar cable interconnection of FIG. 2 at least generally fully extended across the hinge cap with no significant slack.

When the planar cable array 10 is used across the hinge gap as the electrical interconnection between the door 3 as the main electrical system in the vehicle body 7, as can best be seen in FIGS. 2A & 2B, the main or lateral plane of the cable lays in a vertical alignment parallel to the hinge axis. As the door is moved from an open position (FIG. 2B) to its closed position (FIG. 2A) and vice-versa, the planar cable 10 folds back off and then onto itself aobut a vertical fold line 15 parallel to the hinge axis. Of course, if the hinge axis for the door 3 is canted or angled somewhat from the vertical, the plane of the cable 10 will only be generally vertical in its alignment.

Additionally, preferably, the door opening 2 and the body opening 5 for the interconnecting cable 10 are at the same vertical level, with there just being a little over enough extent or length of the planar cable 10 between the openings 2, 5 to make it across the hinge gap when the door 3 is fully open (FIG. 2B), thereby eliminating any wasted wire length. As can be seen in FIG. 2B, there is preferably no significant play or excess cable length between the openings 2, 5, when the door 3 is fully oepn to its maximum open position.

Figure 4:
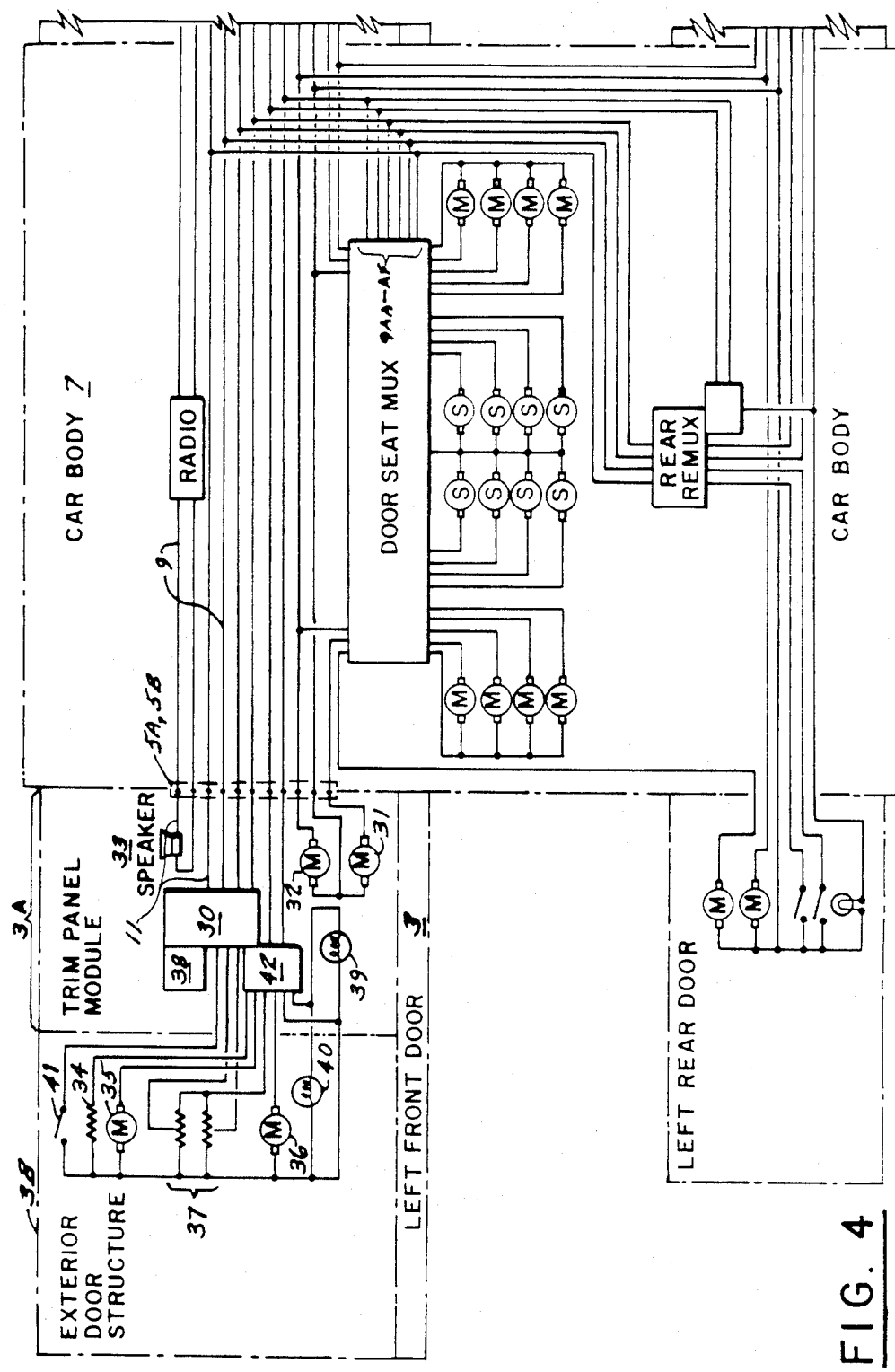
FIG. 4 is an electrical schematic of an exemplary wiring circuit for the electrical door components utilizing a remote multiplexing control module or "remux" within the door itself, with such a system allowing the use of a relatively few wires even for a highly powered door, such as the exemplary one illustrated.

As illustrated in the schematic of FIG. 4, if a part of the multiplexing system of the vehicle's electrical system is included within the driver's door 3 in the form of a remote multiplexing module or "remux" 30, a total of, for example, only about twelve or even eight wires are necessary to be extended from the door to the main electrical system through the individual wires 9 in the vehicle body 7, even for a highly powered, driver's door 3. The door electrical components can include, for example, electrically powered windows having drive motors 31 and switch array controls 38, not only for the adjacent window, but also for the other windows and well as other door components; a powered door lock actuator 32; audio speaker 33; seat positioning controls; a curb lamp 39; a key lock light 40 actuated by the exterior handle switch 41; and even a powered, heated, side rear-view mirror having a heater 34, a vertical movement motor 35 and a horizontal movement motor 36 working under the controls 37. In the exemplary schematic shown in FIG. 4, the exemplary circuit uses nine electrical wires, along with two audio speaker wires, extending from the door 3 to the main vehicle body 7 across the hinge gap in the form of a planar cable array 10.

This reduced number of wires particularly lends itself to the planar cable array interconnection approach of the present invention. Thus, even though the door 3 includes such electrically powered components, as the electrically powered door lock 32, the electrically operated and powered window system 31, an electrically powered and heated, side, rear-view mirror, and the audio speaker 33, such fully powered door only requires, with the remote multiplexing module 30 in the door, an exemplary nine wires. For further background on the multiplexing aspects of this specification, and in particular how the number of wires 11 can be varied, depending on, for example, circuitry changes and programming logic, reference is had to the co-pending application entitled "Automotive Door Muliplexing System"referred to above, the disclosure of which is incorporated herein by reference.

Although the planar cable can be added to the door 3 during the main manufacturing assembly of the vehicle, it alternatively can be provided as part of a modular door panel sub-assembly operation, such as that generally described in the co-pending U.S. application Ser. No. 097,555 referred to above. As can be seem in or generally understood from FIGS. 1, 2 & 4, such an interior door trim panel module 3A can, for example, have mounted on it the remux unit 30; the panel actuator or switch panel portion 38 for the powered door lock 32, etc.; the actuator and power drive portions 31 of the powered window system; the audio speaker 33; etc. All of the direct or indirect power wires 11 for these items can be initially collected together in a bundle within the panel module 3A, as illustrated in FIG. 2, and then positioned in parallel array flat against the internal side of the interior trim panel module 3A at an area across from the embossed channel in the door frame member 3B. Alternatively, flat cabling or wiring could be used all across the lateral extent of the panel module 3A too, if so desired.

The planar cable 10 then extends out from the combined edges of the panel 3A and door frame member 3B, being sandwiched between them in the embossed channel 3B' formed in the door frame member, from the door to an extent sufficient to go across the hinge gap, when the door 3 is fully open, and additionally extend to the "A" pillar body opening 5 with its fixed, mating electrical connector 5B. In turn the "A" pillar connector 5B on its interior side is connected by soldering or the like to the ends of the individual wires 9, which are interconnected to the main electrical power system of the vehicle.

Figure 5A:
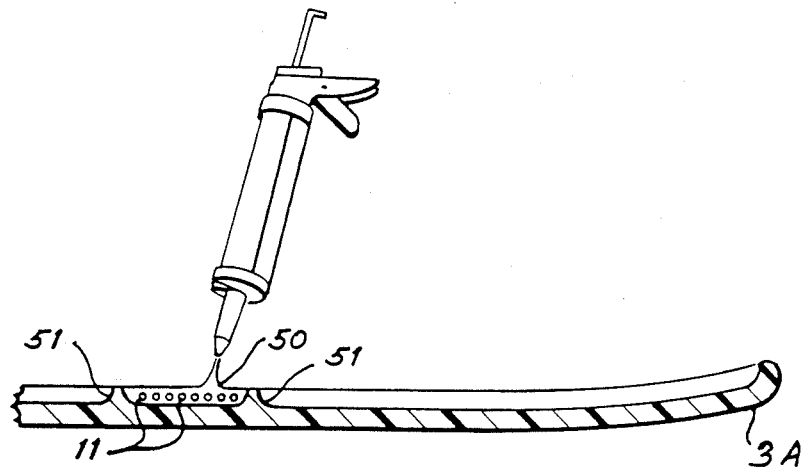

The planar cable 10 could be pre-manufactured as, for example, ribbon cable with the end connector 5A, or, particularly in view of the fact that a different number of wires 11 are used for differently equipped door panels 3A or with differently configured circuits, it could be produced on site as part of the sub-assembly modular operation. In the latter instance and as can be seen in FIG. 5A, the wires 11 are fixed or held in place in side-by-side, parallel array, and a liquid, bonding, preferably insulating material 50 added about them. The plastic material 50 is then allowed to harden in place, using mold walls or channel 51, producing, when appropriately flared and extended in the area which will be across from the channel area 3B' in the side edge of the door frame member 3B, an analogous cast-in-situ version of the planar cable structure shown in FIG. 3. An exemplary material 50 would be a suitable thermosetting polyurethane elastomer. The channel walls 51 could be molded in as part of the molded panel module 3A.

Alternatively, rather than being in liquid or flowable form, at least one layer or, alternatively, two layers of thermoplastic bonding material could be positioned above and below the positioned wires 11, in sandwich fashion, and the layers heated to melting and thereafter allowed to solidify, producing the planar cable.

Figure 5B:
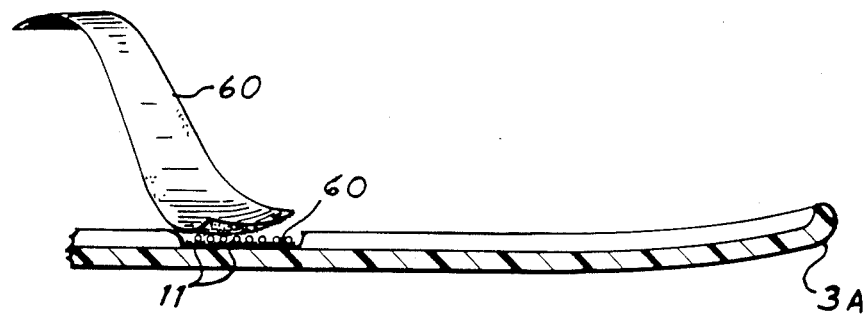
FIG. 5B is a view similar to FIG. 5A, but with the wires being made on site in the sub-assembly operation into the planar cable with the use of adhesive tape members are part of the modular panel sub-assembly operation.

A further exemplary, alternate method of making the planar cable on site is illustrated in FIG. 5B. As can be seen, pieces of tape-type adhesive material 60 are placed above and below the positioned wires 11, in sandwich fashion, and the "sandwich" layers pressed together until the cable elements are fully bonded together, forming the planar cable structure.

It should be understood that FIGS. 5A & 5B are merely generalized, symbolic illustrations of the methodology and are not necessarily to be taken literally.

Although this invention has been shown and described with respect to detailed, exemplary embodiments thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below.

I claim:

1. In a vehicle having
   a movable door and a main body having a body opening in it for receiving an electrical interconnection through it, and a main electrical power supply system located in the vehicle body with a flexible electrical interconnection extending between the door and the vehicle body,
   a door frame member and a movable, vehicular door panel movably carried by the vehicle body for movement to and from open and closed door positions with respect to the vehicle body, said movable door panel having a cable area at its side edge for receiving an electrical cable at its attachment side closest to the vehicle body, the door frame member and the door panel being mated together to form the door of the vehicle having side edge area, and
   several electrical components mounted in said door to be powered by the main power supply system,
   the improvement comprising:
   an electrical, planar cable extending from the door panel past the cable area and extended to the vehicle body, said electrical cable being at least relatively flat and laterally extended, having a greater width than thickness, and having included within it a series of at least three juxtaposed, substantially parallel, extended electrical wires in a substantially side-by-side array and having less than five wires in its thickness dimension, said planar cable electrically interconnecting the several electrical components in the door into the main electrical power supply system of the vehicle and said flat cable and the side edges of the door in combination with a seal member on the vehicle body having a side edge area forming a face-to-face seal between themselves when the door is closed, with said planar cable being sandwiched between the facing side edge areas of the door and said sealing member.

2. The vehicular door-to-body electrical interconnection of claim 1, wherein:
   there are of the order of at least seven wires in substantially side-by-side array in said electrical cable.

3. The vehicular door-to-body electrical interconnection of claim 2, wherein:
   all of said wires lie in the same lateral plane.

4. The vehicular door-to-body electrical interconnection of claim 1, wherein:
   the width of said planar cable is at least three times greater than its thickness.

5. The vehicular door-to-body electrical interconnection of claim 2, wherein:
   said door panel further includes a remote multiplexing "remux" unit, a powered window system, a powered door lock, a powered, side rear-view mirror and at lesat one audio speaker, all of which are electrically interconnected at least indirectly to said power supply system through said planar cable.

6. The vehicular door-to-body electrical interconnection of claim 1, wherein:
   there is included in combination with said door panel a complete door frame, forming a complete vehicle door, said door and vehicle body being hingedly attached together, with the planar cable extending across the hinge cap at least adjacent to the body opening, the plane of said planar cable lying in a substantially vertical plane in its extent from said door panel to said body opening.

7. The vehicular door-to-body electrical interconnection of claim 6, wherein:
   said door is hinged to said body for opening and closing movement about a hinge axis, said planar cable being folded back onto itself with a fold-line substantially parallel to said hinge axis when said door is closed.

8. The vehicular door-to-body electrical interconnection of claim 6, wherein:
   said door is hinged to said main body by a set of hinges which rotate about a substantially vertically aligned axis and wherein the plane of said planar cable array is substantially vertically aligned as its travels from said door panel to said body opening.

9. The vehicular door-to-body electrical interconnection of claim 8, wherein:
   the length of said planar cable between said door opening area and said body opening is substantially equal to the separation distance between said door panel and said body opening when said door is in its maximum, open position without any additional significant slack in the electrical cable between the door panel and the body opening when the door is completely open.

10. The vehicular door-to-body electrical interconnection of claim 6, wherein:

the length of said planar cable between said door panel and said body opening is substantially equal to the separation distance between said door panel and said body opening when said door is in its maximum, open position, without any additional significant slack in the electrical cable between the door panel and the body opening when the door is completely open.

11. The vehicular door-to-body electrical interconnection of claim 1, wherein:

said planar cable terminates in an end connector, and said body opening includes a mating electrical connector connecting said cable into the main electrical power supply system of the vehicle.

12. A vehicle having a movable door to main vehicle body electrical interconnection, comprising:

a main electrical power supply system located in said vehicle body;

electrical components located in said door powered by said main power supply;

said vehicle body having a body opening in it for establishing an electrical connection between said electrical main power supply system and said electrical components in said door;

said movable door movably attached to said body for movement to and from open and closed positions, said movable door having a flat, substantially vertically extended, side edge area at its attachment side closest to said vehicle body, said door being hinged to said vehicle body for opening and closing movement about a substantially vertical hinge axis; and an electrical, planar cable extending from said door through said flat side edge area at least adjacent to said vehicle body electrically interconnecing said electrical components to said the main power supply system through said body opening, said electrical cable being, flexible and relatively flat and laterally extended and included within it a series of juxtaposed, substantially parallel, extended electrical wires in a substantially side-by-side array at least indirectly electrically interconnecting said electrical components in said door into said main electrical power supply system of the vehicle, there being of the order of at least three wires in a substantially side-by-side array in said electrical cable, the plane of said planar cable substantially lying in a vertical plane in its extent from said side edge area to said body opening, said planar cable being folded back onto itself with a fold-line substantially parallel to said hinge axis when said door is closed, the plane of said planar cable array being substantially vertically aligned as it travels from said door side edge area to said body opening, the length of said planar cable between said side edge area and said body opening being substantially equal to the separation distance between said side edge area and said body opening when said door is in its maximum, open position, without any additional significant slack in the electrical cable between said door and said door opening when the door is completely open, said side edge area and said body opening being at the same vertical level, said planar cable extending directly across from said side edge area at least adjacent to said body opening in a horizontal path avoiding any significant vertical run of the electrical cable.

13. The vehicular door-to-body electrical interconnection of claim 12, wherein:

all of said wires lie in the same plane.

14. The vehicular door-to-body electrical interconnection of claim 12, wherein:

the width of said planar cable is at least three times greater than its thickness.

15. The vehicular door-to-body electrical interconnection of claim 12, wherein:

said electrical components include a remote multiplexing "remux" unit; and at least two of the following:

a powered window system, a powered door lock, a powered side rear-view mirror and at least one audio speaker, all of which are electrically interconnected at least indirectly to said power supply through said planar cable.

* * * * *

UNITED STATES PATENT AND TRADEMARK OFFICE
CERTIFICATE OF CORRECTION

PATENT NO. : 4,862,011

DATED : August 29, 1989

INVENTOR(S) : James A. Wright

It is certified that error appears in the above-identified patent and that said Letters Patent is hereby corrected as shown below:

Column 1, line 59, "interconnecting" should be --interconnection--.

Column 1, line 61, "protecting" should be --protective--.

Column 3, line 67, "are" should be --as--.

Column 4, line 17, "beings" should be --begins--.

Column 4, line 21, "tubber" should be --rubber--.

Column 5, line 38, "as" should be --and--.

Column 5, line 44, "aobut" should be --about--.

Column 5, line 58, "oepn" should be --open--.

Signed and Sealed this

Thirtieth Day of October, 1990

Attest:

HARRY F. MANBECK, JR.

*Attesting Officer*  *Commissioner of Patents and Trademarks*